(12) United States Patent
Cantolino

(10) Patent No.: US 9,503,015 B2
(45) Date of Patent: Nov. 22, 2016

(54) SOLAR PANEL SUPPORT

(71) Applicant: Christopher R. Cantolino, Bradenton, FL (US)

(72) Inventor: Christopher R. Cantolino, Bradenton, FL (US)

( * ) Notice: Subject to any disclaimer, the term of this patent is extended or adjusted under 35 U.S.C. 154(b) by 0 days.

(21) Appl. No.: 14/120,459

(22) Filed: May 20, 2014

(65) Prior Publication Data

US 2015/0340985 A1 Nov. 26, 2015

(51) Int. Cl.
*F16B 7/02* (2006.01)
*H02S 20/20* (2014.01)
*H02S 20/10* (2014.01)
*F16B 7/04* (2006.01)

(52) U.S. Cl.
CPC ............... *H02S 20/20* (2014.12); *H02S 20/10* (2014.12); *F16B 7/025* (2013.01); *F16B 7/0413* (2013.01); *Y10T 403/7018* (2015.01)

(58) Field of Classification Search
USPC ........ 248/224.7, 224.51, 224.61, 151, 354.1, 248/354.3, 354.5; 403/361, 359.6, 367, 403/368, 371, 374.1, 377, 379.4, 379.5, 403/409.1
See application file for complete search history.

(56) References Cited

U.S. PATENT DOCUMENTS

| | | | | |
|---|---|---|---|---|
| 2,516,472 | A * | 7/1950 | Mackeage, Jr. | 403/336 |
| 4,804,290 | A * | 2/1989 | Balsells | 403/326 |
| 4,998,701 | A * | 3/1991 | Rawald | 248/224.7 |
| 6,095,713 | A * | 8/2000 | Doyle et al. | 403/97 |
| 6,202,369 | B1 * | 3/2001 | Partee | E01F 9/0117 248/523 |
| 6,854,919 | B2 * | 2/2005 | Neumann et al. | 403/326 |
| 2013/0177352 | A1 * | 7/2013 | Gompper | 403/361 |

* cited by examiner

*Primary Examiner* — Alfred J Wujciak
(74) *Attorney, Agent, or Firm* — Dorothy S. Morse

(57) ABSTRACT

A solar panel support comprising an upper coupling member including a hollow sleeve having a tapered inner surface increasing in diameter or cross-sectional dimension from the proximal end to the distal end having a key or wedge decreasing in width from the proximal end to the distal end projecting inwardly from the inner surface thereof and a lower support member including an elongated hollow pole or shaft having a slit or slot formed on the proximal end to receive the key or wedge therein such that when the elongated hollow pole or shaft is slidably received in the hollow sleeve and the key or wedge is aligned with the slit or slot the upper portion of the elongated hollow pole or shaft is squeezed by the hollow sleeve wedging the key within the slit or slot to secure the upper coupling member and lower support member together.

20 Claims, 4 Drawing Sheets ived above a surface. Several such devices are described in the following prior art.
SOLAR PANEL SUPPORT

BACKGROUND OF THE INVENTION

1. Field of the Invention

A solar panel support to support a solar panel above the ground or other surface.

2. Description of the Prior Art

A number of stakes or posts have been devised to hold a device above a surface. Several such devices are described in the following prior art.

U.S. Pat. No. 1,611,708 describes a pedestal including a sleeve inserted into a hollow post and adjusted to the desired elevation. A wedge is positioned in a sleeve slot. A screw bolt is then entered into the threaded hole of the wedge and then the screw bolt is tightened thereby causing the wedge to be adjusted outward and in so doing the beveled edges of the wedge will engage and spread the slot jaws and spread thereby expanding the sleeve into secure gripping engagement with the post.

U.S. Pat. No. 5,188,367 discloses a golf training exercise apparatus including an inwardly tapered tube.

U.S. Pat. No. 3,869,218 teaches a support structure for book cases, tables, display racks and the like including a lug in the interior for engagement with a groove.

Additional examples of the prior art are found in: U.S. Pat. No. 2,841,634; U.S. Pat. No. 3,338,605; U.S. Pat. No. 3,843,271; U.S. Pat. No. 4,009,845; U.S. Pat. No. 4,121,378; U.S. Pat. No. 4,892,279; U.S. Pat. No. 5,435,509; U.S. Pat. No. 5,655,741; U.S. Pat. No. 7,302,745; U.S. Pat. No. 7,481,461; U.S. Pat. No. 7,637,684; U.S. Pat. No. 8,117,787; U.S. Pat. No. 8,267,359; U.S. Pat. No. 8,297,873; US 2007/0164174; US 2007/0204860; US 2011/0005512; US 2012/0199706; US 2012/0312348 and US 2013/0256246.

While some of the prior art may contain some similarities relating to the present invention, none of them teach, suggest or include all of the advantages and unique features of the invention disclosed hereafter.

SUMMARY OF THE INVENTION

The present invention relates to a solar panel support comprising an upper coupling member and a lower support member.

The upper coupling member comprises a top portion and a bottom portion. The top portion of the upper coupling member comprises a hollow sleeve to operatively receive a post or connector attached to a solar panel. The bottom portion of the upper coupling member comprises a lower hollow sleeve having a tapered inner surface increasing in diameter or cross-sectional diameter from the proximal end to the distal end thereof having a key or wedge decreasing in width from the proximal end and the distal end thereof formed on the inner surface of the hollow sleeve.

The lower support member comprises an elongated hollow pole or shaft less in diameter or cross-section dimension than the diameter or cross-sectional dimension of the distal end portion of the hollow sleeve of the top portion of the upper coupling member such that the proximal end of elongated hollow pole or shaft will slide into the distal end of the hollow sleeve. A slit, groove or slot decreasing in width from the proximal end to the distal end is formed on the proximal end portion of the elongated hollow pole or shaft dimensioned to receive at least a portion of the key or wedge when the upper coupling member and lower support member are operatively joined together and the key or wedge and slit, groove or slot are operatively aligned relative to each other.

The solar panel support, the upper coupling member and the lower support member are positioned with the distal end of the hollow sleeve and the proximal end of the elongated hollow pole or shaft in axially alignment relative to each other. Then, with the key or wedge aligned with the slit, groove or slot, the proximal end of the elongated hollow pole or shaft is telescoped into the distal end of the hollow sleeve such that the tapered inner surface of the lower hollow sleeve to force the sides of the slit, groove or slot against the sides of the key or wedge is advanced into the slit, groove or slot to secure the upper coupling member and the lower support member together.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and object of the invention, reference should be had to the following detailed description taken in connection with the accompanying drawings in which.

Similar reference characters refer to similar parts throughout the several views of the drawings.

DETAILED DESCRIPTION OF THE INVENTION

Figure 1:
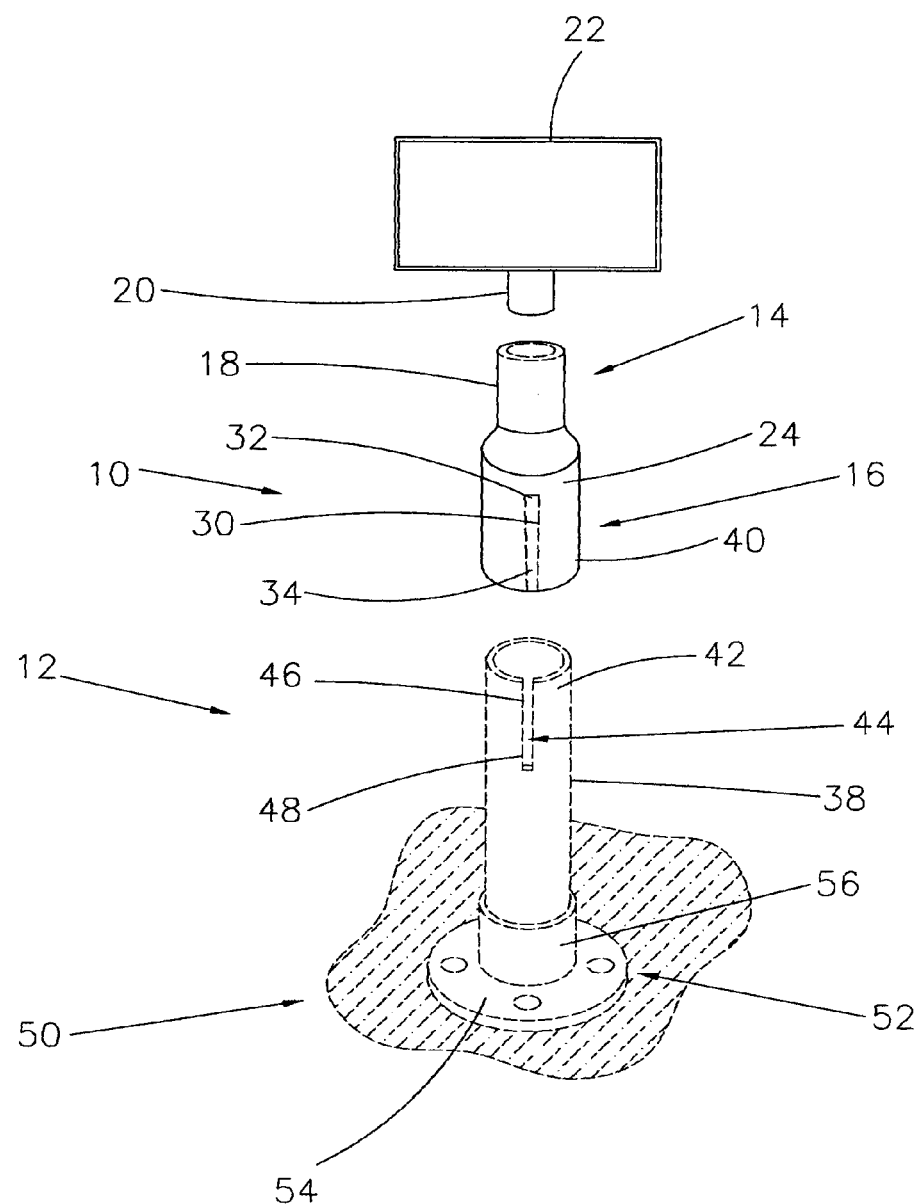
FIG. 1 is an exploded view of the solar panel support of the present invention.

As shown in FIG. 1, the present invention relates to a solar panel support comprising an upper coupling member generally indicated as 10 and a lower support member generally indicated as 12.

As shown in FIGS. 1 through 5, the upper coupling member 10 comprises a top portion generally indicated as 14 and a bottom portion generally indicated as 16.

The top portion 14 of the upper coupling member 10 comprises a hollow substantially cylindrical sleeve 18 to operatively receive a post or connector 20 attached to a solar panel 22.

Figure 3:
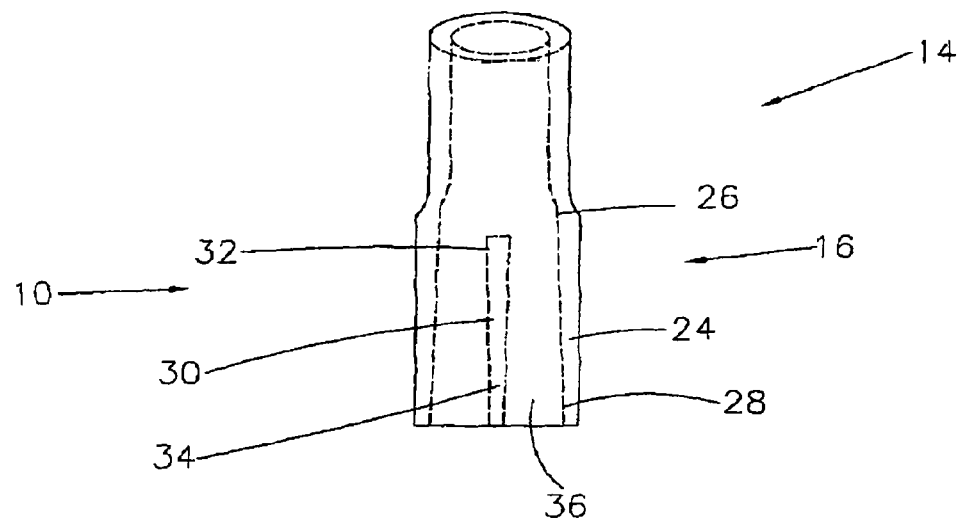
FIG. 3 is a cross-sectional front view of the upper coupling member of the present invention.
Figure 4:
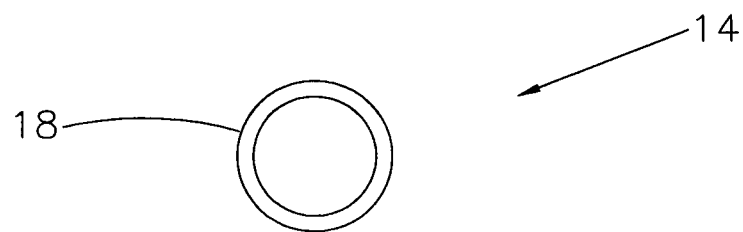
FIG. 4 is an end view of the top portion of the upper coupling member of the present invention.
Figure 5:
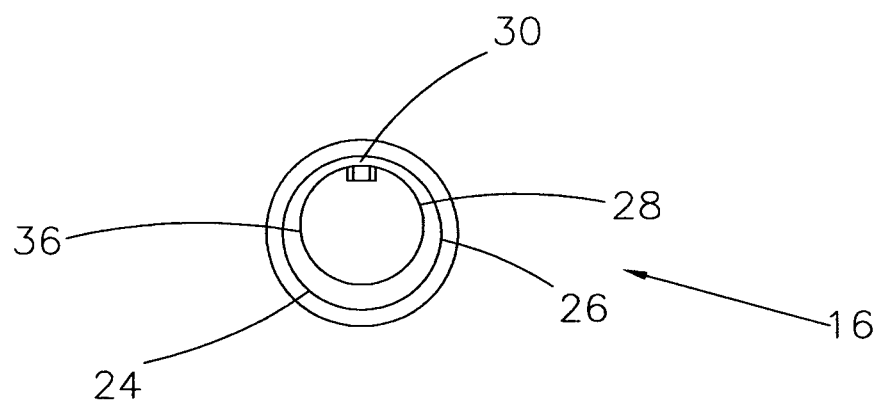
FIG. 5 is an end view of the bottom portion of the upper coupling member of the present invention.

The bottom portion 16 of the upper coupling member 10 comprises a lower hollow substantially cylindrical sleeve 24 having a tapered inner surface 36 increasing in diameter or cross-sectional diameter from the proximal end 26 to the distal end 28 thereof (see FIGS. 3 and 5) having a key or wedge 30 decreasing in width from the proximal end 32 and the distal end 34 thereof formed on the inner surface 36 of the hollow substantially cylindrical sleeve 24 (see FIGS. 1 and 3).

Figure 2:
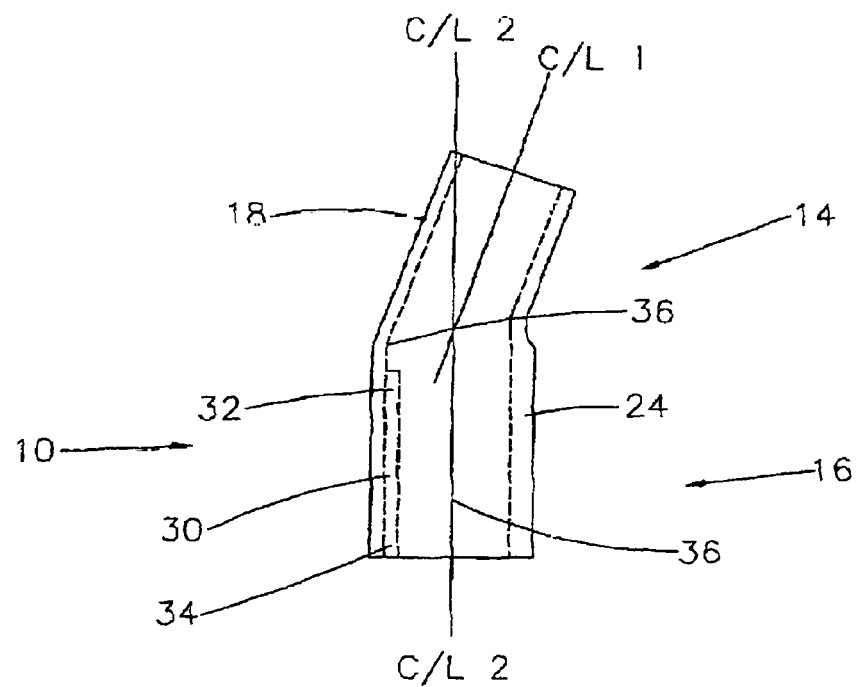
FIG. 2 is a cross-sectional side view of the upper coupling member of the present invention.

As best shown in FIG. 2, the longitudinal center line CL of the top portion 14 of the upper coupling member 10 is off-set or inclined relative to the longitudinal center line CL of the lower portion 16 of the upper coupling member 10. Further, the key or wedge 30 is substantially parallel to the center line CL of the lower portion 16 of the upper coupling member 10.

As shown in FIG. 1, the lower support member 12 comprises an elongated hollow substantially cylindrical pole or shaft 38 less in diameter or cross-sectional dimension than the diameter or cross-sectional dimension of the distal end portion 40 of the substantially cylindrical sleeve 24 such that the proximal end 42 of elongated hollow substantially cylindrical pole or shaft 38 will slide into the distal end 40 of the lower hollow substantially cylindrical sleeve 24. A slit, groove or slot 44 decreasing in width from the proximal end 46 to the distal end 48 thereof is formed on the proximal end portion 42 of the elongated hollow substantially cylindrical pole or shaft 24 dimensioned to receive at least a portion of the key or wedge 30 when the upper coupling member 10 and lower support member 12 are operatively joined together and the key or wedge 30 and slit, groove or slot 40 are operatively aligned relative to each other.

The lower support member 12 may comprise a hollow substantially cylindrical pole or shaft 38 such that the support may function to support devices other than solar panels 22 above a surface.

As shown in FIG. 1, the elongated hollow substantially cylindrical pole or shaft of the lower support member 12 may be anchored or supported on a floor, ground or other surface 50 by a base generally indicated as 52 that may comprise a footing or platform 54 and collar 56.

Figure 6:
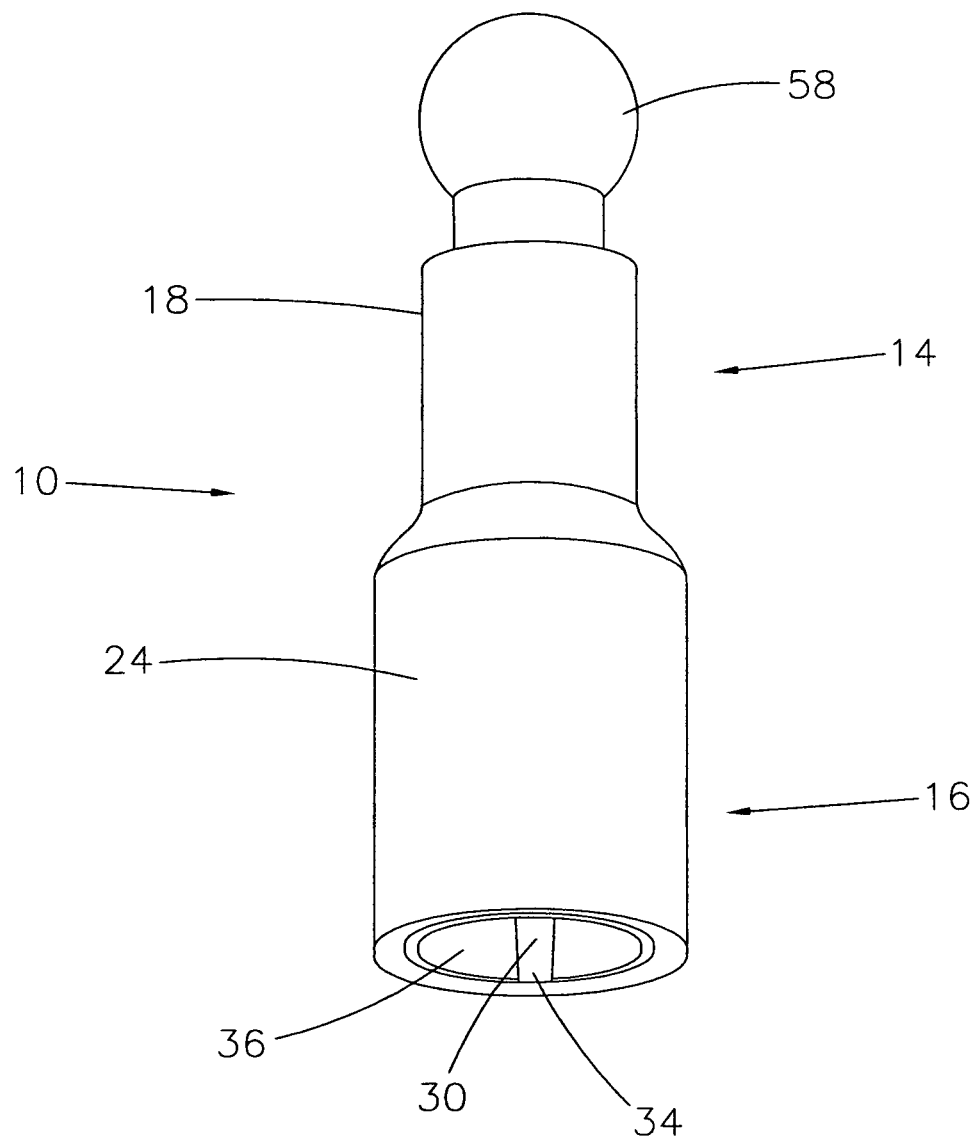
FIG. 6 is rear view of the upper coupling member of the present invention.

FIG. 6 shows a similar solar panel support with an alternate ball-like coupling member 58 formed on the upper portion of the hollow substantially cylindrical sleeve 18 of the top portion 14 of the upper coupling member 10 to mount a solar panel (not shown) having a mounting recess formed therein.

To assemble the solar panel support, the upper coupling member 10 and the lower support member 12 are positioned with the distal end 40 of the hollow substantially cylindrical sleeve 24 and the proximal end 42 of the elongated hollow substantially cylindrical pole or shaft 38 in axial alignment relative to each other. Then, with the key or wedge 30 aligned with the slit, groove, or slot 44, the proximal end 42 of the elongated hollow substantially cylindrical pole or shaft 38 is telescoped into the distal end 40 of the hollow substantially cylindrical sleeve 24 such that the tapered inner surface 36 of the lower hollow substantially cylindrical sleeve 24 forces the sides of the slit, groove, or slot 44, against the sides of the key or wedge 30 as the key or wedge 30 is advanced into the slit, groove, or slot 44 to secure the upper coupling member 10 and the lower support member 12 together.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,
What is claimed is:

1. A solar panel support comprising:
an upper coupling member including a hollow sleeve having a tapered inner surface increasing in diameter or cross-sectional dimension from the proximal end to the distal end having a key or wedge decreasing in width from the proximal end to the distal end depending inwardly from the tapered inner surface thereof, said key or wedge including a pair of sides extending between the proximal and distal ends thereof; and, wherein the upper coupling member receives a post or tubular connector;
a lower support member including a hollow pole or shaft having a slit, slot, or groove formed on the proximal end to receive at least a portion of said key or wedge therein such that when said proximal end of said hollow pole or shaft is slidably received in said hollow sleeve and with said key or wedge slidably received within said slit, slot, or groove, said proximal end of said hollow pole or shaft is compressed inwardly by said tapered inner surface of said hollow sleeve while telescoping into said hollow sleeve until said inward compression against said pole or shaft wedges said sides of said key or wedge in said slit, slot, or groove to secure said upper coupling member and said lower support member together, wherein the lower support member mounts on a fixed surface.

2. The solar panel support of claim 1 wherein said hollow sleeve comprises a hollow substantially cylindrical sleeve and said hollow pole or shaft comprises an elongated hollow substantially cylindrical pole or shaft less in diameter or cross-section dimension than the diameter or cross-sectional dimension of said distal end portion of said hollow substantially cylindrical sleeve such that said proximal end of said elongated hollow substantially cylindrical pole or shaft will slide into said distal end of said hollow substantially cylindrical sleeve.

3. The solar panel support of claim 2 wherein a solar panel is secured within said hollow substantially cylindrical sleeve.

4. The solar panel support of claim 3 wherein said elongated hollow substantially cylindrical pole or shaft of said lower support member is anchored or supported on a floor, ground, or other surface by a base.

5. The solar panel support of claim 2 wherein said elongated hollow substantially cylindrical pole or shaft of said lower support member is anchored or supported on a floor, ground, or other surface by a base.

6. The solar panel support of claim 1 wherein said upper coupling member further comprises a top portion including a hollow substantially cylindrical sleeve to operatively receive the post or tubular connector attached to a solar panel.

7. The solar panel support of claim 1 wherein said upper coupling member has a top portion including a hollow sleeve and a bottom portion including said hollow sleeve having said tapered inner surface, said top portion and said bottom portion each having a longitudinal center line, and said longitudinal center line of said top portion is offset or inclined relative to said longitudinal center line of said bottom portion.

8. The solar panel support of claim 1 wherein said slit, groove, or slot has a proximal end adjacent to said proximal end of said hollow pole or shaft and an opposing distal end, said slit, groove, or slot decreasing in width from said proximal end to said opposing distal end.

9. The solar panel support of claim 1 wherein said upper coupling member has a top portion including a ball-like coupling member.

10. A solar panel support comprising:
an upper coupling member including a hollow sleeve having a tapered inner surface increasing in diameter or cross-sectional dimension from the proximal end to the distal end having a key or wedge including a proximal end and a distal end, said key or wedge also depending inwardly from the tapered inner surface thereof and having a pair of sides extending between said proximal and distal ends thereof; and, wherein the upper coupling member receives a post or tubular connector;
a lower support member including a hollow pole or shaft having a slit, slot, or groove including a proximal end and a distal end formed on the proximal end of said hollow pole or shaft to receive at least a portion of said key or wedge therein, the width dimension of said slit, slot, or groove decreasing from said proximal end to said distal end thereof, such that when said proximal end of said hollow pole or shaft is slidably received in said hollow sleeve and with said key or wedge slidably received within said slit, slot, or groove, said proximal end of said hollow pole or shaft is compressed inwardly by said tapered inner surface of said hollow sleeve while telescoping into said hollow sleeve until said inward compression against said pole or shaft wedges said sides of said key or wedge in said slit, slot, or groove to secure said upper coupling member and said lower support member together, wherein the lower support member mounts on a fixed surface.

11. The solar panel support of claim 10 wherein said hollow sleeve comprises a hollow substantially cylindrical sleeve and said hollow pole or shaft comprises an elongated hollow substantially cylindrical pole or shaft less in diameter or cross-section dimension than the diameter or cross-sectional dimension of said distal end portion of said hollow substantially cylindrical sleeve such that said proximal end of said elongated hollow substantially cylindrical pole or shaft will slide into said distal end of said hollow substantially cylindrical sleeve.

12. The solar panel support of claim 11 wherein a solar panel is secured within said hollow substantially cylindrical sleeve.

13. The solar panel support of claim 12 wherein said elongated hollow substantially cylindrical pole or shaft of said lower support member is anchored or supported on a floor, ground, or other surface by a base.

14. The solar panel support of claim 11 wherein said elongated hollow substantially cylindrical pole or shaft of said lower support member is anchored or supported on a floor, ground, or other surface by a base.

15. The solar panel support of claim 10 wherein the width of said key or wedge decreases from said proximal end to said distal end thereof.

16. A solar panel support comprising:
an upper coupling member including a hollow sleeve having a key or wedge including a pair of sides decreasing in width from the proximal end to the distal end, said key or wedge depending inwardly from the inner surface of said hollow sleeve; and, wherein the upper coupling member receives a post or tubular connector;
a lower support member including a hollow pole or shaft having a slit, slot or groove formed on the proximal end thereof to receive at least a portion of said key or wedge therein such that when said proximal end of said hollow pole or shaft is slidably received in said hollow sleeve and with said key or wedge slidably received within said slit, slot or groove, said proximal end of said hollow pole or shaft is compressed inwardly by said inner surface of said hollow sleeve while telescoping into said hollow sleeve until said inward compression against said pole or shaft wedges said sides of said key or wedge in said slit, slot or groove to secure said upper coupling member and said lower support member together, wherein the lower support member mounts on a fixed surface.

17. The solar panel support of claim 16 wherein said hollow sleeve comprises a hollow substantially cylindrical sleeve and said hollow pole or shaft comprises an elongated hollow substantially cylindrical pole or shaft less in diameter or cross-section dimension than the diameter or cross-sectional dimension of said distal end portion of said hollow substantially cylindrical sleeve such that said proximal end of said elongated hollow substantially cylindrical pole or shaft will slide into said distal end of said hollow substantially cylindrical sleeve.

18. The solar panel support of claim 17 wherein a solar panel is secured within said hollow substantially cylindrical sleeve.

19. The solar panel support of claim 18 wherein said elongated hollow substantially cylindrical pole or shaft of said lower support member is anchored or supported on a floor, ground or other surface by a base.

20. The solar panel support of claim 17 wherein said elongated hollow substantially cylindrical pole or shaft of said lower support member is anchored or supported on a floor, ground or other surface by a base.

* * * * *